(12) United States Patent
Jomard

(10) Patent No.: US 10,464,532 B2
(45) Date of Patent: Nov. 5, 2019

(54) END-FITTING FOR A VEHICLE WINDSCREEN WIPER

(71) Applicant: Valeo Systèmes d'Essuyage, Le Mesnil Saint Denis (FR)

(72) Inventor: Olivier Jomard, Aubiere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/403,238

(22) Filed: Jan. 11, 2017

(65) Prior Publication Data

US 2017/0203732 A1    Jul. 20, 2017

(30) Foreign Application Priority Data

Jan. 15, 2016   (FR) ...................................... 16 50311

(51) Int. Cl.
*B60S 1/38* (2006.01)
*B60S 1/40* (2006.01)

(52) U.S. Cl.
CPC ............. *B60S 1/3894* (2013.01); *B60S 1/381* (2013.01); *B60S 1/3805* (2013.01); *B60S 1/3886* (2013.01)

(58) Field of Classification Search
CPC ...... B60S 1/3805; B60S 1/381; B60S 1/3894; B60S 1/3806
See application file for complete search history.

(56) References Cited

U.S. PATENT DOCUMENTS

| 2,703,902 | A | 3/1955 | Thomas et al. | |
| 9,248,808 | B2* | 2/2016 | Moll | B60S 1/3805 |
| 2012/0005855 | A1 | 1/2012 | Egner-Walter et al. | |
| 2013/0183838 | A1* | 7/2013 | Caillot | B60S 1/3805 439/34 |
| 2014/0317873 | A1* | 10/2014 | Moll | B60S 1/3805 15/250.08 |
| 2014/0331438 | A1* | 11/2014 | Izabel | B60S 1/4006 15/250.32 |
| 2015/0121644 | A1* | 5/2015 | Young, III | B60S 1/381 15/250.201 |
| 2015/0166015 | A1* | 6/2015 | Moll | B60S 1/3886 15/250.201 |
| 2017/0151931 | A1* | 6/2017 | Caillot | B60S 1/40 |

FOREIGN PATENT DOCUMENTS

| CN | 200948781 Y | 9/2007 | |
| CN | 101412394 A | 4/2009 | |
| JP | 2014218241 A | * 11/2014 | ............ B60S 1/3805 |

OTHER PUBLICATIONS

First Office Action in corresponding Chinese Application No. 201710205849.6, dated Sep. 20, 2018 (13 pages).

* cited by examiner

*Primary Examiner* — Michael D Jennings
(74) *Attorney, Agent, or Firm* — Osha Liang LLP

(57) ABSTRACT

End-fitting (122') for a windscreen wiper of a vehicle, in particular a motor vehicle, comprising a body defining a housing (122b) for receiving at least one element of said blade, characterized in that it further comprises electrical connection means (140).

19 Claims, 3 Drawing Sheets

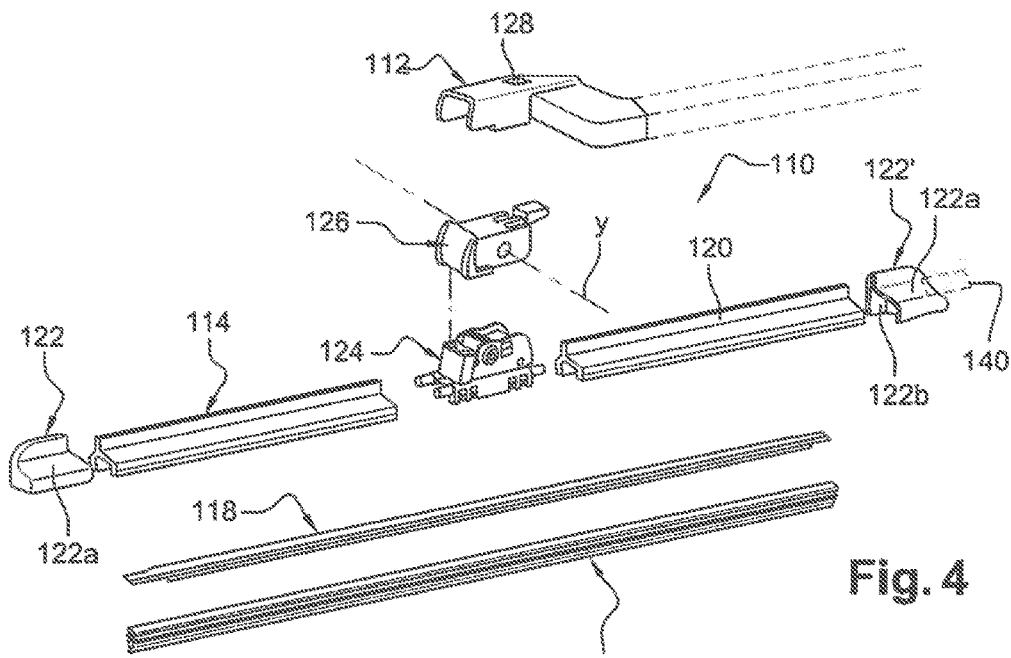
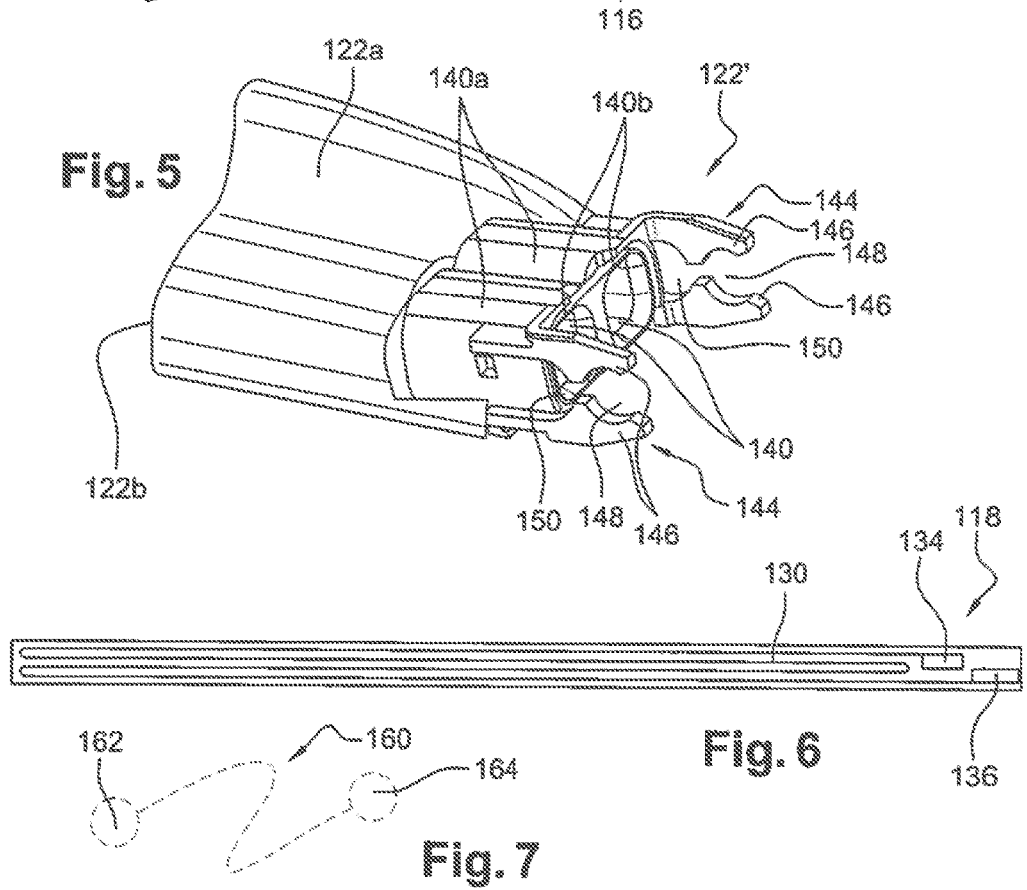

END-FITTING FOR A VEHICLE WINDSCREEN WIPER

BACKGROUND

The present invention relates to an end fitting for a windscreen wiper of a vehicle, in particular a motor vehicle, and a vehicle windscreen wiper comprising such an end-fitting.

It is known practise to heat a motor vehicle windscreen wiper, in particular to de-ice it in winter. In the case where this wiper is equipped with internal windscreen washing liquid distribution channels, the heating of the wiper further makes it possible to heat the liquid before it is sprayed onto the windscreen of the vehicle, which facilitates the de-icing of the windscreen and can thus avoid the use of a manual ice scraper.

Typically, a windscreen wiper of the "flat wiper" type comprises a longitudinal body bearing a wiping blade, generally made of rubber, intended to rub against the windscreen of the vehicle to dispel water by bringing it out of the field of view of the driver. The wiper further comprises at least one longitudinal spine which confers a bowing on said wiping blade, so as to promote the application of this blade on the windscreen. The wiper is borne by an arm which is driven by a motor in an angular reciprocating motion. The link means linking the wiper to the arm generally comprises a connector which is secured to the body and an adapter which is hinged on the body and fixed to an end of the arm.

In the current art, the heating means of a windscreen wiper generally comprise a heating electrical conductor of resistive type.

It has already been proposed to equip the bowing spine of a wiper with heating means, these heating means taking the form of a film which is added and glued onto the spine and which includes a circuit or a track of a heating electrical conductor. In the current art, the heating electrical conductor of the circuit forms a loop, the ends of which are linked to electrical power supply terminals.

These terminals are situated in a median part of the spine and are intended to be connected to electrical connection means incorporated in the abovementioned connector. This connector, also called "mechanical" connector because of its mechanical cooperation with the adapter in particular, is intended to cooperate with another connector, called "electrical" connector, which is itself linked to a current source of the vehicle.

It will therefore be understood that, in the current art, the electrical power supply of a windscreen wiper is produced from the link means linking the wiper to the arm, which presents drawbacks.

The link means, and in particular the connector incorporate electrical connection means which make it complex to produce and therefore costly. That is emphasized when the connector also incorporates hydraulic connection means, intended to cooperate with another connector, called "hydraulic" connector, to supply the wiper with windscreen washer fluid.

SUMMARY OF DISCLOSURE

The invention proposes a refinement to the technology described above, which is a simple, effective and economical solution.

The invention proposes an end-fitting for a windscreen wiper of a vehicle, in particular a motor vehicle, comprising a body defining a housing for receiving at least one element of said wiper, characterized in that it further comprises electrical connection means.

The electrical connection is thus remotely sited on the end-fitting, that is to say at a longitudinal end of the wiper. This solution can present a number of advantages: it limits the issues of space for incorporating the electrical connection in the middle of the wiper, and more specifically at the connector; the incorporation of the electrical connection in the end-fitting avoids the development and adds to the additional parts.

The invention is applicable to an end-fitting for any type of windscreen wiper, such as a windscreen wiper of a front or rear window of a vehicle. This end-fitting may or may not have an aerodynamic profile.

The end-fitting according to the invention can comprise one or more of the following features, taken in isolation from one another or in combination with one another:
said electrical connection means are at least partly incorporated in said body or formed of a single piece with said body,
said electrical connection means comprise electrical connection contacts configured to be electrically connected to complementary contacts of an electrical power supply connector of the wiper,
said electrical connection contacts are configured to cooperate by fitting with said electrical connector,
the end-fitting comprises fixing means configured to cooperate with said electrical connector,
said fixing means are configured to cooperate by elastic snap-fitting with said electrical connector,
said electrical connection means are configured to be electrically connected to a conductor of said at least one element,
said electrical connection means are configured to be electrically connected to a heating electrical conductor made of resistive material of said at least one element, and
said body has at least one aerodynamic surface.

The invention relates also to a kit for a windscreen wiper of a vehicle, in particular a motor vehicle, comprising at least one end flitting as described above, and at least one longitudinal stiffening spine of which a longitudinal end is engaged or configured to be engaged in said housing of the end-filling.

It is thus possible to consider replacing a spine and an end-fitting of a wiper from the prior art with those from the kit. This replacement can be permanent or temporary. A temporary replacement can in fact be envisaged in the case, for example, where a user wants to equip a windscreen wiper of a vehicle with a heating spine to de-ice the windscreen of the vehicle.

The kit according to the invention can comprise one or more of the following features, taken in isolation from one another or in combination with one another:
said spine bears heating means produced in heating electrical conductor form, of which power supply terminals are situated at said longitudinal end and are connected or configured to be connected to said electrical connection means of the end-fitting,
the kit comprises an electrical connection cable of which a first end is connected or configured to be connected to said electrical connection means of the end-fitting, and a second end of said cable is connected to a connection member configured to be plugged into a vehicle cigarette lighter plug, or to a control module allowing a remote power supply.

The present invention relates also to a windscreen wiper for a vehicle, in particular a motor vehicle, comprising at least one end-fitting as described above.

Advantageously, the wiper comprises a longitudinal stiffening spine of which a longitudinal end is engaged in said housing of the end-fitting, said spine bearing heating means, produced in heating electrical conductor form, of which power supply terminals are situated at said longitudinal end and connected to said electrical connection means of the end-fitting.

The invention will be better understood and other details, features and advantages of the invention will become apparent on reading the following description given by way of nonlimiting example and with reference to the attached drawings.

BREIF DESCRIPTION OF DRAWINGS

FIG. 4 is an exploded perspective view of a motor vehicle windscreen wiper according to the invention;

FIG. 5 is a perspective schematic view of an end-fitting according to the invention;

FIGS. 6 and 7 are perspective schematic views of a stiffening spine and of a cable for a kit according to the invention.

DETAILED DESCRIPTION

It must be noted that the figures show the invention in detail for implementing the invention, said figures obviously being able to be used to better define the invention as appropriate.

In the following description, the terms longitudinal or lateral refer to the orientation of the windscreen wiper according to the invention. The longitudinal direction corresponds to the main axis of the wiper in which it extends, whereas the lateral orientations correspond to completing straight lines, that is to say straight lines which cross the longitudinal direction, notably at right angles to the longitudinal axis of the wiper in its plane of rotation. For the longitudinal directions, the terms up or down are understood in relation to the point of fixing of the wiper onto the arm, the term internal corresponding to the part where the arm and a half-wiper extend.

Figure 1:
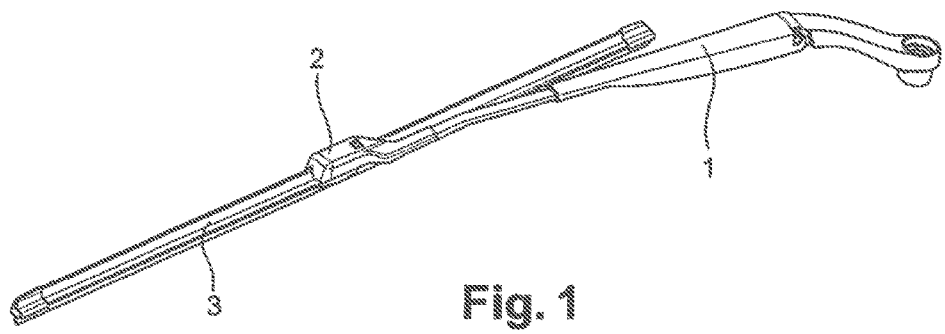
FIG. 1 is a perspective schematic view of a wiping system for a window of a motor vehicle according to the prior art.
Figure 2:
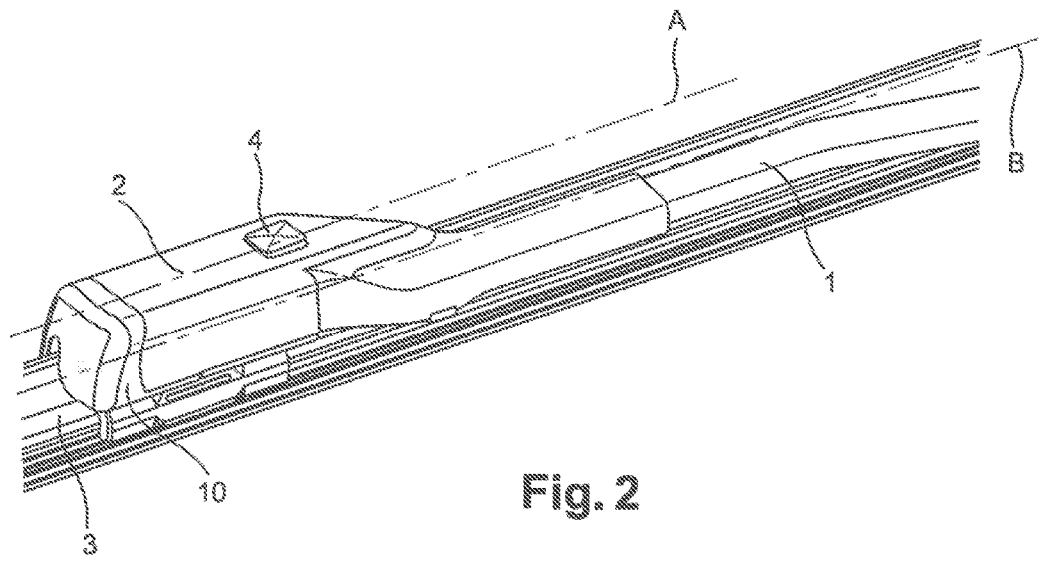
FIG. 2 is a detailed view of FIG. 1, showing the link between the windscreen wiper and the driving arm.

Referring to FIGS. 1 and 2, a wiping system can be seen comprising an arm 1 extended at its outer end by a terminal piece 2, which is fixed for example by crimping onto the arm 1. The terminal piece 2 covers an adapter bearing the wiper 3 via a mechanical connector 10. The function of the adapter is to be inserted into the terminal piece 2 by a translational movement in a first longitudinal direction A of the terminal piece 2, to come into the position of use, otherwise called operating position, where it is positioned in abutment against a cooperating form given to the terminal piece 2. It is then fixed thereto reversibly by means of a retractable locking button 4, which cooperates with an orifice formed for this purpose in the top part of the terminal piece. The wiper extends longitudinally in a second longitudinal direction referenced B.

Figure 3:
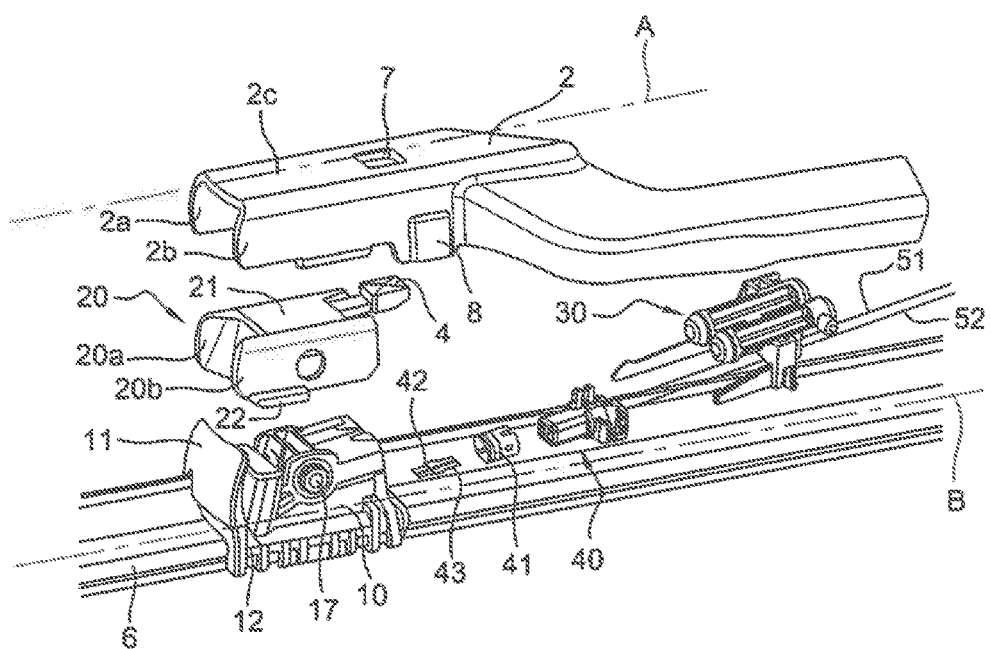
FIG. 3 is an exploded view of the link of FIG. 2.

Now referring to FIG. 3, the detail of the elements ensuring the attachment of the wiper 3 to the arm I can be seen.

The terminal piece 2 is in the form of an inverted "U" in which the opening of this "U" form faces the glazing. This terminal piece 2 comprises a base 2c in the top part and two lateral branches 2a and 2b extending towards the glazing. On the base 2c, an orifice 7 is formed in which the retractable locking button 4 deriving from the adapter 20 comes to be housed. The bottom section of each lateral branch comprises an end folded at 90° towards the internal volume defined by the base 2c and the branches 2a and 2b, the function of which is, on the one hand, to longitudinally guide the introduction of the adapter 20 and, on the other hand, to serve as translational abutment for corresponding abutments placed on the adapter 20. On at least one of the lateral branches 2a or 2b of the terminal piece 2, there is fixed a retaining means 8, the function of which is to retain the electrical connector directly or indirectly via a support 30. The retaining means 8 blocks a translation of the electrical connector 40 upon the removal of the wiper 3 to keep it within the internal volume of the terminal piece 2, which will be described in detail later. Advantageously, a retaining means 8 is secured to each of the constituent lateral branches 2a and 2b of the terminal piece 2. In such a situation, the terminal part 2 comprises two retaining means 8 opposite to one another.

The adapter 20 is in the form of a cap, complementing the internal volume of the terminal piece 2, so as to come to be housed therein. Two lateral walls 20a and 20b are joined by a bridge 21 and each comprise, at their free ends, a flange 22 folded outwards from the adapter. These flanges 22 form a translational abutment when they come to bear against the folded edges of the lateral branches of the terminal piece 2. This adapter 20 also comprises two holes formed through the lateral walls 20a and 20b and having one and the same axis, intended to serve as axis of rotation between the wiper 3 and the arm 1 to allow a rotational freedom between the arm 1 and the wiper 3 when the wiping system describes the reciprocating motions. This makes it possible for the wiper 3 to follow the curvature of the glazing to be wiped.

The mechanical connector 10 is secured non-removably to the wiper 3 so as to ensure the transmission of the mechanical force originating from the arm 1 to the wiper 3. It has a substantially parallelepipedal form extending in the second longitudinal direction B of the wiper 3, with two lateral flanks from which two journals or shafts 17 extend laterally, the functions of which are, on the one hand, to secure the mechanical connector to the adapter 20 and, on the other hand, to serve, by their cooperation with the holes formed in the lateral walls 20a and 20b of the adapter, as axis for the rotation of the wiper 3 relative to the arm 1.

On the outside, the mechanical connector has a wall 11, called cap, which, firstly, doses the front part of the terminal piece 2 and acts as a screen to protect the components contained in this terminal piece 2 and, secondly, ensures a well constructed outer finish. The face opposite the cap 11 of the mechanical connector 10, called internal face, comprises electrical connection orifices (not visible) capable of receiving the electrical connector 40.

This internal face of the mechanical connector 10 also comprises one or more hydraulic inlet orifices extended by internal windscreen washer fluid distribution channels. These distribution channels (not represented in the figures)

extend inside the mechanical connector 10 to emerge in line with supply ducts 12 formed in the mechanical connector 10 and thus supply wiper fluid spraying tubes 8. These tubes extend along two edges of the wiper 3 in order to spray windscreen washer fluid in the to and fro movements of the wiper. These features concerning the spraying of the windscreen washer fluid are generally called windscreen washer fluid spraying device, for the case where the windscreen wiper would be connected to a windscreen washer fluid spraying system.

The hydraulic input orifices delimit channels internal to the mechanical connector, these channels also having the function of accommodating the support 30 to keep it in position in the mechanical connector 10.

The electrical input orifices delimit ducts internal to the mechanical connector 10, the function of these ducts being to accommodate the electrical connector 40 and ensure the electrical connection between the electrical network of the vehicle and the wiper 3.

These internal ducts contain male contacts 42 and 43 onto which female terminals borne by the electrical connector 40 are fitted. This electrical connection provides the electrical power necessary to the operation of the heating element incorporated in the wiper.

This electrical connector 40 receives two electrical cables 51 and 52 through which runs the electrical current from the electrical network of the vehicle. These cables 51 and 52 are gathered together to form a bundle which extends into the internal volume of the terminal piece 2 and under the arm.

The electrical connector 40 also receives a sealing device 41 threaded onto the body. This sealing device 41 ensures the seal-tightness of the electrical link between the electrical connector 40 and the mechanical connector 10.

The technology of FIGS. 1 to 3 exhibits drawbacks described above.

FIG. 4 illustrates the general principle of the invention and FIGS. 5 to 7 illustrate an embodiment of the invention.

FIG. 4 illustrates a windscreen wiper 110 of a motor vehicle windscreen and a driving arm 112 of this wiper 110, this arm 112 being partially represented and intended to be driven by a motor for the wiper to follow an angular reciprocating movement making it possible to dispel water and possibly other undesirable elements covering the windscreen.

The wiper 110 here comprises a longitudinal body 114, a wiping blade 116, generally of rubber, and at least one spine 118 which confers a bowing on the blade 116 so as to promote the application of this blade onto the windscreen.

The body 114 of the wiper 110 comprises a top deflector 120 intended to enhance the operation of the wiper, the aim of this deflector 120 being to improve the pressing of the wiper onto the windscreen and therefore the aerodynamic performance of the system.

The wiper 110 further comprises end-fittings 122, 122' for attaching the blade 116 and the spine 118 to the body. These end-fittings 122, 122' are situated at each of the longitudinal ends of the body 114. Each end-fitting 122, 122' comprises a body defining a housing 122b for receiving the blade 116 and/or the spine 118. Furthermore, in the example represented, each end-fitting 122, 122' has at least one aerodynamic surface 122a.

The body 114 of the wiper is, here, produced in two independent parts which are arranged substantially end-to-end and connected to one another by an intermediate connector 124.

To ensure its fitting onto the arm 112, the wiper 110 comprises an adapter 126 mounted on the connector 124 and allowing an articulation of the wiper 110 relative to the arm 112. The articulation of the wiper 110 relative to the arm 112 is an articulation by a rotational movement about an axis of rotation Y at right angles to the longitudinal axis of the wiper 110. The wiper 110 in fact needs to have at least one degree of freedom in rotation relative to the arm 112 and, more specifically, in relation to a terminal piece 128 of the arm 112, to allow the wiper 110 to follow the curvature of the windscreen.

The wiper is preferably of the type comprising a heating element, this heating element comprising a circuit or a track of a heating electrical conductor and a support for this circuit.

The support for the circuit is the spine 118 or one of the spines of the wiper in the example represented. A spine 118, for example of metal, has an elongate form. A spine 118 generally has, in section, a substantially rectangular form and comprises two substantially parallel flat surfaces, respectively upper and lower.

FIG. 6 represents an embodiment of the spine 118. One of the flat surfaces of this spine 118 is covered with a heating electrical conductor 130. The heating electrical conductor is generally made of stainless steel or of an alloy based on copper, nickel, aluminium, etc. (cupro, brass, etc.).

The heating electrical conductor 130 here comprises a loop of which the ends are linked respectively to two electrical power supply terminals, respectively positive 134 and negative 136.

The terminals 134, 136 are situated at one of the longitudinal ends of the spine 118, so as to be able to cooperate with electrical connection means of one of the end-fittings 122, 122', and in particular the electrical end-fitting 122' of which an embodiment is represented in FIG. 5.

In the exemplary embodiment of FIG. 5, the electrical connection means are incorporated in the body of the end-fitting 122'. The electrical connection means 140 comprise electrical connection contacts 140 configured to be connected, here by fitting, to complementary contacts of an electrical power supply connector of the wiper, similar for example to that 40 of FIG. 3.

The contacts 140 can comprise a non-conductive part 140a, for example plastic, which is formed of a single piece with the body of the end-fitting 122', and a conductive part 140b, for example metallic—of lug type, housed or partly embedded in the first part.

The contacts 140 are oriented in a direction corresponding to the desired direction of fitting with the electrical connector. In the example represented, this direction is inclined relative to the longitudinal axis of the wiper or of the spine.

The end-fitting 122' comprises fixing means 144 configured to cooperate with the electrical connector. In the example represented, these fixing means are configured to cooperate by elastic snap-fitting with the electrical connector. Here they comprise two substantially parallel and elastically deformable lateral tabs 146. Each tab 146 comprises a through orifice 148 for mounting a pin of complementary form of the electrical connector, and a notch 150 emerging in the orifice for the passage of the pin to the orifice. The notch 148 and the orifice 150 of each tab separate this tab into two portions which are elastically deformable by movement away from one another, to allow the abovementioned passage.

Although not visible in the drawings, the connection means of the end-fitting 122' are configured to be electrically connected to the terminals 134, 138 of the circuit 130 of the spine 118 and comprise, for example, in the abovementioned housing 122b of the end-fitting 122', metallic electrical connection tabs, connected to the conductive parts 140*b* of the contacts 140 and intended to cooperate by sliding and contact with the terminals 134, 136 of the spine 118 when the end of the spine is mounted in the housing 122*b* of the end-fitting.

The invention relates notably to the end-fitting 122' as such, but also to a kit for windscreen wiper comprising at least one end-fitting 122' of this type and at least one spine 118, preferably heating.

It is possible to envisage the end-fitting 122' being pre-mounted on the spine 118. The electrical link between the terminals 134, 136 of the circuit of the spine and the connection means of the end-fitting 122' could therefore be of permanent type. For that, the tabs of the connection means of the end-fitting can be welded to the terminals 134, 136 of the circuit 130 of the spine.

Advantageously, this kit comprises an electrical power supply cable 180, visible in FIG. 7, of which an end 162 is connected or configured to be connected to the connection means of the end-fitting. The cable and the end-fitting can also be pre-assembled. The second end 164 of the cable can be connected to a connection member configured to be plugged into a vehicle cigarette lighter plug. This end can also be connected to a connection member to the battery of the vehicle or to a control module allowing a remote power supply.

In cold weather, a user can thus temporarily fit the kit onto a windscreen wiper, by replacing the spine and an end-fitting of this wiper with those from the kit, then by connecting the cable linked to the end-fitting to the vehicle cigarette lighter plug or the control module. After the wiper is heated, the latter can be displaced over the windscreen to de-ice it. The kit can then be dismantled and stowed away for its next use.

What is claimed:

1. An end-fitting for a windscreen wiper of a motor vehicle, comprising:
    a body defining a housing for receiving at least one element of said wiper; and
    electrical connection means configured to provide externally supplied power, and comprising contacts configured to be directly electrically connected to complementary contacts of an electrical power supply connector of the wiper,
    wherein said contacts comprise two distinct parts comprising an outer, non-conductive part and a conductive part housed or partly embedded inside the non-conductive part, and
    wherein the non-conductive part is formed of a single piece with the body of the end-fitting.

2. The end-fitting according to claim 1, in which said electrical connection means are at least partly incorporated in said body or formed of a single piece with said body.

3. The end-fitting according to claim 1, in which said electrical connection contacts are configured to cooperate by fitting with said electrical connector.

4. The end-fitting according to claim 1, further comprising fixing means configured to cooperate with said electrical connector.

5. The end-fitting according to claim 4, in which said fixing means are configured to cooperate by elastic snap-fitting with said electrical connector.

6. The end-fitting according to claim 1, in which said electrical connection means are configured to be electrically connected to a conductor of said at least one element.

7. The end-fitting according to claim 6, in which said electrical connection means are configured to be electrically connected to a heating electrical conductor made of resistive material of said at least one element.

8. The end-fitting according to claim 1, in which said body has at least one aerodynamic surface.

9. A kit for a windscreen wiper of a motor vehicle, comprising:
    at least one end-fitting, the at least one end-fitting comprises:
        a body defining a housing for receiving at least one element of said wiper, and
        electrical connection means configured to provide externally supplied power, and comprising contacts configured to be directly connected to complementary contacts of an electrical power supply connector of the wiper,
        wherein said contacts comprise two distinct parts comprising an outer, non-conductive part and a conductive part housed or partly embedded inside the non-conductive part,
        wherein the non-conductive part is formed of a single piece with the body of the end-fitting; and
    at least one longitudinal stiffening spine of which a longitudinal end is engaged or configured to be engaged in said housing of the at least one end-fitting.

10. The kit according to claim 9, in which said spine bears heating means, produced in heating electrical conductor form, of which power supply terminals are situated at said longitudinal end and are connected or configured to be connected to said electrical connection means of the at least one end-fitting.

11. The kit according to claim 9, further comprising an electrical connection cable of which a first end is connected or configured to be connected to said electrical connection means of the at least one end-fitting.

12. The kit according to claim 11, in which a second end of said cable is connected to a connection member configured to be plugged into a vehicle cigarette lighter plug, or to a control module allowing remote power supply.

13. A vehicle windscreen wiper blade, comprising:
    at least one end-fitting, the at least one end-fitting comprises:
        a body defining a housing for receiving at least one element of said wiper, and
        electrical connection means configured to provide externally supplied power, and comprising contacts configured to be directly connected to complementary contacts of an electrical power supply connector of the wiper,
        wherein said contacts comprise two distinct parts comprising an outer, non-conductive part and a conductive part housed or partly embedded inside the non-conductive part, and
        wherein the non-conductive part is formed of a single piece with the body of the end-fitting.

14. The vehicle windscreen wiper blade according to claim 12, comprising a longitudinal stiffening spine of which a longitudinal end is engaged in said housing of the at least one end-fitting, said spine bearing heating means produced in heating electrical conductor form, of which power supply terminals are situated at said longitudinal end and connected to said electrical connection means of the at least one end-fitting.

15. A vehicle windscreen wiper, comprising:
    at least one blade;
    at least one spine;

at least one end-fitting configured to be attached to the at least one blade and the at least one spine to a body of the vehicle windscreen wiper; and a heating circuit supported by the at least one spine, wherein said heating circuit comprises a loop of which ends of said loop are linked respectively to two electrical power supply terminals, respectively positive and negative, wherein the two electrical power supply terminals are each connected to electrical connection means of the at least one end-fitting, and wherein the electrical connection means comprising at least two electrical connection contacts of an electrical power supply connector of the vehicle windscreen wiper, each of the electrical connection contacts being connected to one of the electrical power supply terminals.

16. The vehicle windscreen wiper according to claim 15, wherein the at least one spine comprises two parallel flat surfaces, respectively upper and lower, wherein one of the flat surfaces is covered with a heating electrical conductor of the heating circuit.

17. The vehicle windscreen wiper according to claim 16, wherein the at least one spine is metal and the heating electrical conductor is made of stainless steel or of an alloy based on copper, nickel, aluminum, cupro, or brass.

18. The vehicle windscreen wiper according to claim 15, wherein the two electrical power supply terminals are situated at a longitudinal end of the at least one spine.

19. The vehicle windscreen wiper according to claim 15, wherein said electrical connection contacts comprise a non-conductive part formed of a single piece with a body of the at least one end-fitting and a conductive part housed or partly embedded in the non-conductive part.

* * * * *